Feb. 20, 1940.  H. L. BLUM  2,191,194
FLOW CONTROL APPARATUS
Filed Oct. 16, 1936  3 Sheets-Sheet 2
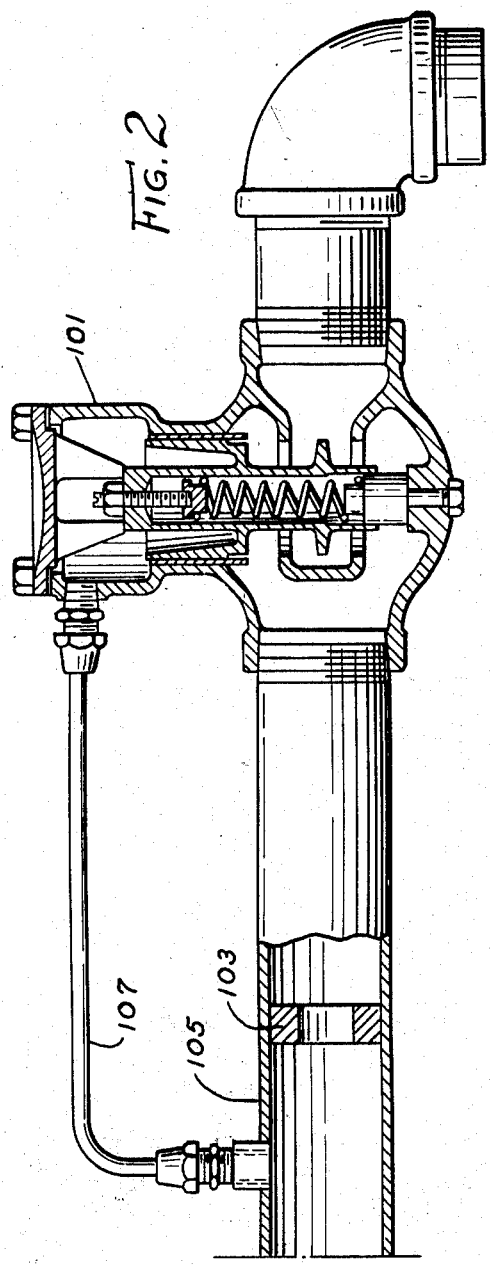
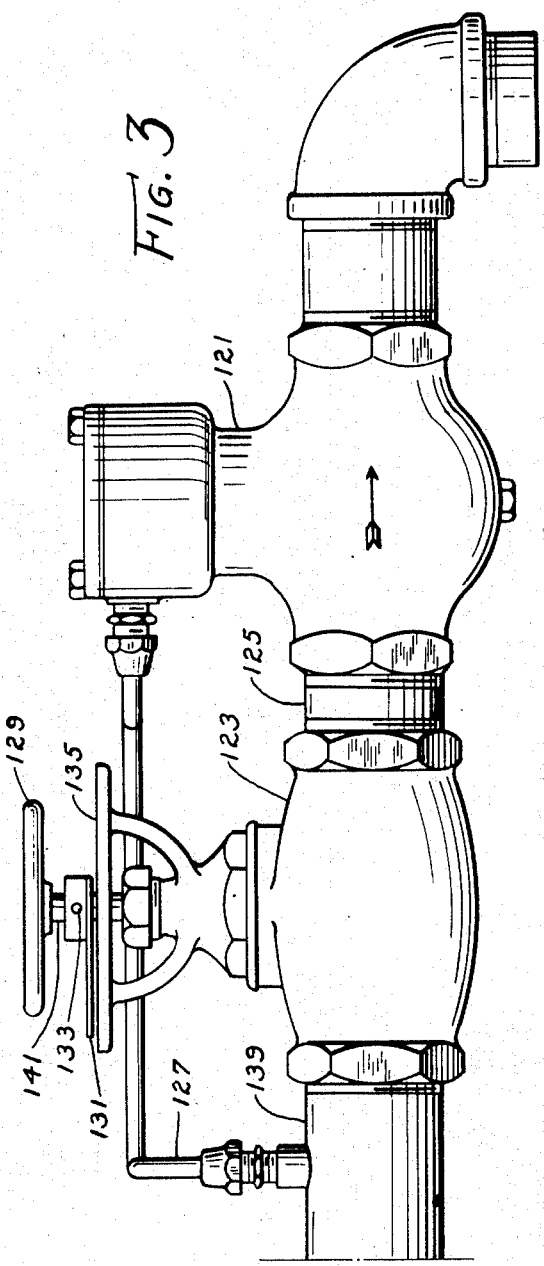
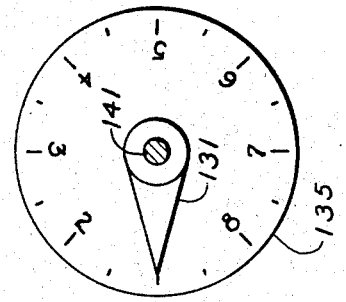
INVENTOR.
Hosmer Lowe Blum
BY Cox & Moore
ATTORNEYS.

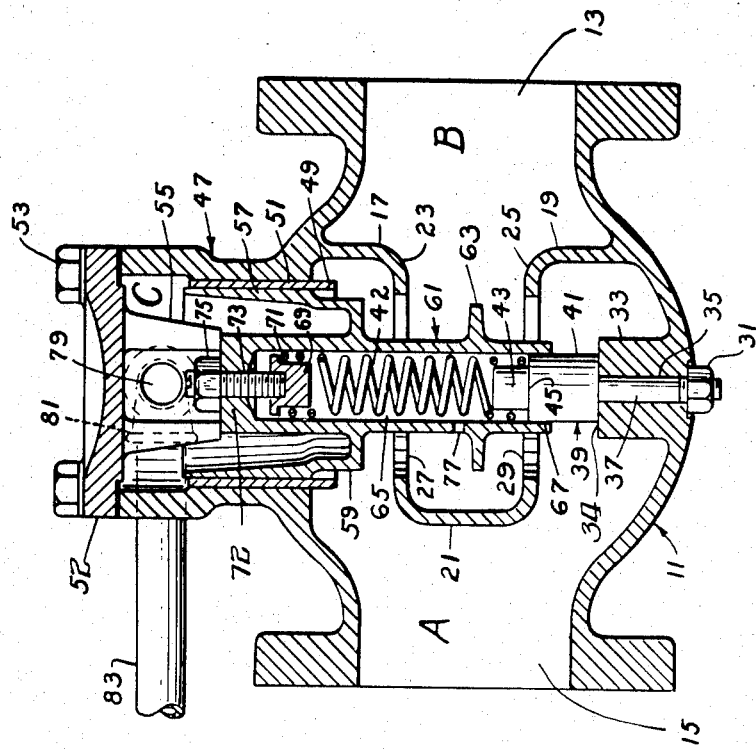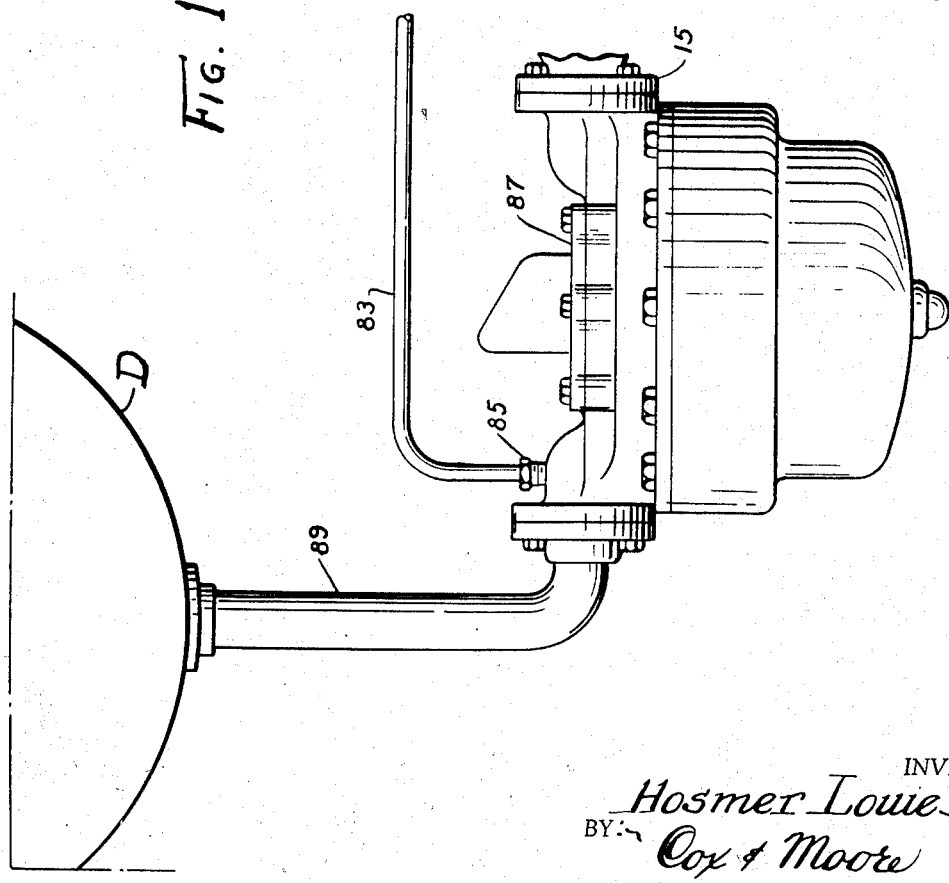

Feb. 20, 1940.	H. L. BLUM	2,191,194
FLOW CONTROL APPARATUS
Filed Oct. 16, 1936    3 Sheets-Sheet 3

Hosmer Louie Blum
INVENTOR.
BY Edmund W. E. Kamm
ATTORNEY.

Patented Feb. 20, 1940

2,191,194

UNITED STATES PATENT OFFICE 2,191,194

FLOW CONTROL APPARATUS

Hosmer Louie Blum, Fort Wayne, Ind., assignor to S. F. Bowser & Company, Incorporated, Fort Wayne, Ind., a corporation of Indiana Application October 16, 1936, Serial No. 105,889

6 Claims. (Cl. 73—199)

This invention relates to a device for maintaining a generally constant pressure differential in a fluid flow device.

The objects of my invention are as follows:

To provide a device, in combination with a fluid meter, which will prevent the meter from being subjected to damaging differentials of pressure.

To provide a valve which is capable of use in combination with a fluid meter to maintain the differential of pressures at the inlet and outlet sides of the meter substantially within a certain value.

To provide, in combination with a fluid meter, a valve which is capable of maintaining the differential of pressures at the inlet and outlet sides of the meter substantially within a certain value and which is adjustable to vary the value.

To provide, in combination with a meter, a device which will protect the meter from being subjected to damaging differentials of inlet and outlet pressure without setting up other harmful conditions in the dispensing line in which the combination is being used.

To provide, in combination with a meter, a valve mechanism which will protect the meter from being subjected to harmful differentials of pressure and which is positively restrained from moving beyond its maximum open and maximum closed position.

To provide, in combination with a fluid meter, a device which will prevent the meter from being subjected to damaging differentials of meter inlet and outlet pressures and which will not impair the accuracy of the measurements and record made by the meter.

To provide a device for use in combination with a fluid meter, which will prevent racing of the meter, regardless of the change of pressure differential across the combination so long as the change is within the range of operation of the device.

To provide a device for use in combination with a meter which will automatically maintain a constant differential pressure across the meter in a flow line in which the differential pressure across the combined meter and device is subject to variation.

To provide in conjunction with a hydraulic instrument which depends for protection and/or accurate functioning upon the maintenance of a pretermined difference of pressure at its inlet and outlet respectively, a mechanism which will maintain said difference of pressures constant as the pressures vary jointly or individually.

To provide a mechanism for use in conjunction with fluid measuring apparatus for insuring the accuracy of its operation by automatically maintaining constant the difference of pressures at the inlet and outlet of the apparatus.

To provide a device which is adapted to be introduced in a fluid conduit downstream of an apparatus which introduces a resistance in the conduit, thereby creating a difference of the pressures at its inlet and outlet respectively, which difference in pressures, is maintained substantially constant by said device.

To provide, in conjunction with an orifice in a dispensing line, a device which will maintain the flow through said orifice constant regardless of substantial changes in line inlet and/or outlet pressures.

To provide, in conjunction with a hydraulic instrument which is adapted for use in a dispensing line and which depends for its protection from damage and/or its accurate functioning upon maintenance of a predetermined difference of pressures at its inlet and outlet, a device which will maintain said difference of pressures as the differential of pressures taken across the conjoined devices varies, without introducing harmful or undesirable effects in the dispensing line as a result of the functioning of said device.

To provide a valve for regulating the differential of pressure which is applied to an instrument, said valve being provided with a piston which is subjected to the individual pressures and which regulates the size of the fluid opening through the valve in accordance with the difference in pressures.

To provide a valve mechanism for use in conjunction with a fluid measuring instrument which is subjected to varying inlet and outlet pressures, said valve being provided with ports to allow the passage of fluid, and being provided with means for changing the effective area of said ports to compensate for the varying inlet and outlet pressure conditions.

To provide a valve mechanism which maintains the differential pressure across a fluid measuring means by varying the volume of fluid discharged by said means.

To provide a control valve device wherein the valve element does not entirely close the port.

To provide a control valve device wherein the area of the valve element is between about ninety per cent and about ninety-five per cent of the area of the port to eliminate fluttering of the valve and consequent "water hammer" or impact in the line.

To provide, in combination with a meter in a flow line, a valve for controlling the rate of flow of liquid through the meter without setting up conditions therein which cause "wire-drawing" and consequent meter inaccuracy.

These and other objects of my invention will be apparent from a perusal of the specification when taken in connection with the drawings wherein Figure 1 discloses a detailed section of the valve arranged in its operative relation with a displacement meter, the valve being enlarged and broken away;

Figure 2 is an elevation partly in section showing a control valve in connection with a simple, fixed orifice;

Figure 3 is an elevation showing a control valve of the type shown in Figure 1 with a variable orifice.

Figure 4 is a view showing the dial and pointer of Figure 3.

Figure 5:
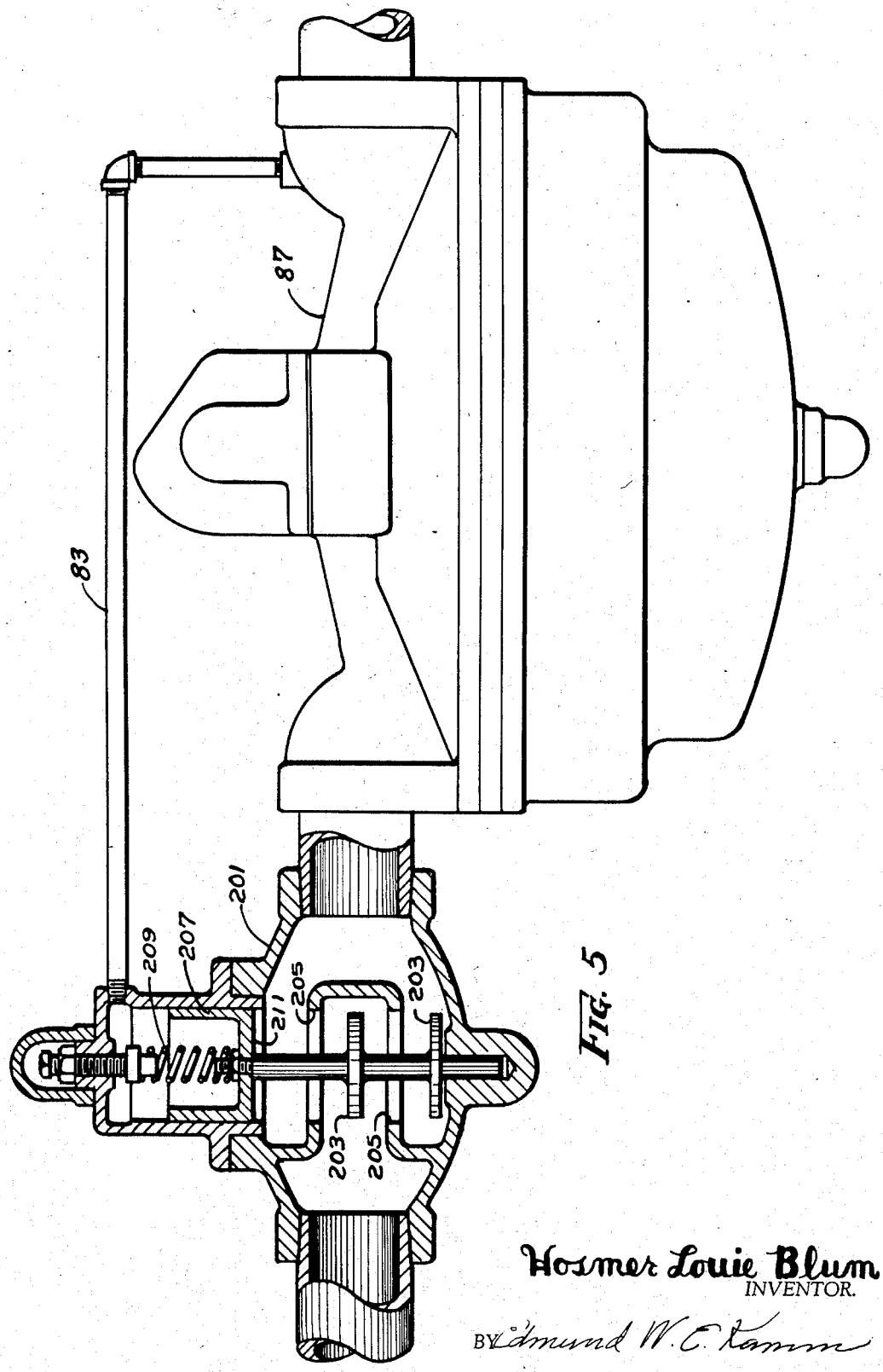
Figure 5 is a view showing a modified form of the valve connected upstream of the meter.

One embodiment of my invention is disclosed in Figure 1 of the drawings which shows the details of the control valve as well as the arrangement of this valve in a dispensing line in combination with a displacement meter.

The valve details will first be explained.

A valve body, indicated generally by the numeral 11, is provided and is preferably of cast material. Outlet opening 13 and inlet opening 15 are provided in the body and these openings may be threaded for the reception of pipes, or they may be surrounded by bolt flanges as shown, for connection to similar fittings which are attached to the dispensing line and the meter or other hydraulic instrument with which the valve is to be used.

Within the valve body are disposed an upper depending web 17 which extends transversely across the valve body, a lower, upstanding web 19 which is disposed in vertical alignment with web 17 and which also extends transversely across the valve body, and a web 21 which is vertically disposed beyond the common plane of webs 17 and 19, and which extends transversely of the valve body with its upper and lower terminal portions in substantial horizontal alignment with the lower and upper terminal portions respectively of webs 17 and 19. Horizontal webs 23 and 25, which extend transversely of the valve body, join the said upper and lower terminal portions of the web 21 with the webs 17 and 19 respectively to form two chambers A and B of the interior of the valve body.

Ports 27 and 29 which are preferably circular in outline are formed in the webs 23 and 25. These ports are in co-axial alignment and preferably of the same diameter and serve to permit passage of fluid from chamber A to chamber B.

Formed integrally with the lower wall of the valve body 11 is a boss 33. The valve body and boss are provided with a cylindrical opening 35 which is in axial alignment with the ports 27 and 29, and which is adapted to receive a pin or projection 37. Said pin 37 is attached to a combination guide, spring seat, and spring centering device. A nut 31 which threadedly engages the end of pin 37 serves to draw an abutment on the element 39 tightly against a seat 34 on the boss. Shellac or other sealing material may be applied to the pin 37 and nut 31 to render the valve body leak-proof at this point.

The guide portion 41 of element 39 is preferably cylindrical and is disposed in axial alignment with the ports 27 and 29. Above and in axial alignment with guide portion 41 extends a spring centering projection 43 which is of smaller diameter than the guide portion 41. The juncture of portion 41 and projection 43 is marked by a shoulder 45 which serves as a seat for a spring which will be described below.

An extension of the valve body, as indicated at 47, forms a chamber C whose walls are substantially symmetrical about the axis of the guide 39. Within the chamber C is disposed a cylindrical sleeve or liner 49 which is pressed into the opening 51 or is otherwise sealingly engaged and held in position in the valve body. At the uppermost end of the valve body extension 47, the chamber C is closed by a cap 52 which is held in place by cap screws or bolts 53 which engage suitable flanges on the valve body. Depending from the cap are spaced abutments 55 whose purpose will be later described.

A piston 57 is adapted to slide vertically and axially within the cylindrical sleeve 49. The lower portion of the piston is of such a diameter that it may cooperate with the port 27 and serve as a valve therefor. The piston is located above the web 23 so that it is subjected to the pressure in chamber A except when it is in its lowermost position. A hollow, cylindrical element 61 serves as a piston rod to support piston 57, as a valve stem to support a valve 63, as a guide rod in conjunction with guide 41, and as a stop element in which function it cooperates with abutments 55 on the cap 52 and with shoulder 34 of boss 33. The valve 63 supported on the element 61 serves to regulate the effective area of the port 29. The valves move upwardly to open.

The element 61 is provided with a cylindrical bore which is indicated by numeral 65, the lower end of which fits over and is guided by the cylindrical guide 41. A helical compression spring 42 is inserted in the bore and its lower end, which is centered by means of projection 43, bears against the spring seat 45. The upper end of the element 61 is closed by a head 72. Spring 42 bears at its upper end against a combined seat and centering element 69 which is provided with an annular spring seat 71. A set screw 73 having a jam nut 75 mounted thereon is threaded in an opening in the upper end or head 72 of the stem. The screw is concentrically disposed with respect to the bore 65 and the piston 57. The lower end of said set screw 73 is positioned for free rotation in an axial bore in the spring seat 69 and is adapted to depress the latter to adjust the degree of compression of spring 42. The jam nut may be tightened against the end of the valve stem and thus serves to maintain the spring in adjustment.

A small opening 77 passing radially through the valve stem 61 near the lower end, but preferably above valve 63, serves to permit a flow of liquid from the interior of the piston rod as it descends and the cylindrical guide 41 enters the rod to displace some of the liquid therein. Similarly when the piston rod rises, liquid is permitted to enter the hollow bore 65 to prevent the building up of a vacuum.

The descending motion of the piston rod is positively stopped by contact of the lower end of the piston rod with the boss 33. In this lowermost position, the valves serve to close the ports 27 and 29 to the maximum extent. In other words the cooperating valves and ports lie in the same horizontal planes.

The stops 55 described above contact with the upper end or head 72 of the element 61 and thus the full open position of the valves with respect to the ports is determined.

A meter 87, which may be of any desirable type or construction, but which is preferably the well-known Bowser "Xacto-Meter" more fully disclosed in my prior Patents 1,977,424 and 1,985,400, is provided in the fluid line up stream or ahead of the valve above described. The meter may be connected to any source of fluid pressure such as a motor driven pump, a gravity tank or even a vacuum pump on the outlet side. Only the gravity tank is shown at D.

An opening 79 leading through the walls of the valve body extension 47 permits connection to be established between the upper portion of chamber C and the inlet side of the meter. To establish this connection, a union L 81, or any other suitable coupling is threadedly fitted into the opening 79 and one end of the tube 83 is then connected in any desired manner with the L or coupling. The other end of tube 83 is then connected by means of a suitable coupling 85 to the inlet side of the meter or to the intake conduit just upstream of the meter. It will be seen that the one side of the piston, which in this case is the upper side, is connected so as to be subjected to the fluid pressure which exists at the meter inlet, while the other or lower side of the piston is subjected when the valve is wholly or partially open to the fluid pressure which exists at the outlet side of the meter, i. e., in chamber A.

The inlet and outlet pressures above referred to will be of different magnitudes due to the resistance offered by the meter to the passage of fluid through it. The meter inlet pressure will exceed the outlet pressure if there is a flow through the meter in the proper direction. It should be noted that the pressure at the meter outlet or chamber A and the pressure at the valve outlet or chamber B differ because of the throttling action of the valve.

The valves 59 and 63 are of such area that they do not entirely close the ports 27 and 29 when they are in the maximum closed position.

Applicant has found by experiment that to enable the valve to perform the function of maintaining the pressure differential across the meter constant, clearance must be provided between the valves and the ports. If too little or no clearance is provided, an excessive and rapid fluttering or hunting action will be set up in the valve during its operation. The sudden opening and closing of the valve ports during such operation of the valve gives rise to impact or what is commonly termed "water hammer" in the dispensing line and such a condition existing in a line causes not only noise but damage to the line and equipment connected in it.

If too much clearance is provided, the valve will not have sufficient closure to enable it to maintain a balancing pressure on the outlet side of the meter and on the lower side of the piston to maintain the differential of pressures required. Applicant has determined from experiment that the area of the clearance space between each valve and its port, when the valve is in closed position, should be from about five to about ten per cent of the total port area. This makes the effective area of the clearance approximately 5¼ to 11 percent of the area of the valve.

The valve is located on the outlet or downstream side of the meter so that it will control the volume of fluid flowing from the meter. A control valve 201 (Fig. 5) of slightly different construction, i. e., one in which the valves 203 move upwardly to close the ports 205, and in which the meter outlet pressures are applied above the piston 207 in aid of a downwardly acting spring 209, could be mounted at the inlet side of the meter to control the flow of fluid to the meter. In this case the meter inlet pressure would be applied to the lower surface 211 of the piston. But where such a valve has been applied to the upstream side of a meter it has been found that closing of the valve results in conditions being set up in the valve which produce the effect which is commonly known as "wire-drawing." Presumably this effect is obtained due to the high velocity of the fluid passing through the valve ports which tends to vaporize and expand the liquid at the valve. This wire-drawing seriously impairs the accuracy of the measurements made by the meter and is, therefore, highly undesirable. All fluids are volumetrically measured by the meter, whether gases, liquids, or liquid and vapors combined. Therefore, if any of the vapors thus formed are in or upstream of the meter, there will be a measurement of gases by the meter with the consequence that the measurements registered by the meter would be inaccurate. It can readily be seen that should there be a vaporizing condition of the nature just described during a metering operation, the measurements as registered by the meter would be highly erratic and unreliable.

By installing a valve of the preferred form at the outlet side of the meter, applicant confines all vaporization and wire-drawing which is incident to operation of the control valve, to the discharge conduit beyond the meter, hence only liquid under pressure is ever measured by the meter and the record found on the meter register will be accurate and reliable.

The operation of the valve in combination with a meter, as shown in Figure 1, is as follows:

Assuming that liquid is flowing through the line 89, meter 87, and valve 11, the pressure at the inlet of the meter will be greater than that at the outlet of the meter (chamber A) or at the outlet of the valve (chamber B) due to resistance of the meter. This higher pressure will be transmitted through coupling 85, pipe 83, L 81 and opening 79 to chamber C where it will be applied to the upper side of piston 57. The meter outlet pressure will be applied through chamber A to the lower or underside of piston 57.

As a result of these pressures and the action of spring 42 which is in opposition to the high or meter inlet pressure, the valves 59 and 63 will assume certain positions with respect to the ports 27 and 29 respectively thus regulating the volume of fluid which leaves the meter. As a result of controlling the volume of fluid discharged, the pressure in chamber A and the meter outlet will be controlled. For instance, when the valves move to further open the ports, the flow from chamber A to chamber B will be increased and the pressure in chamber A will decrease, and when the valves move in a direction to further close the ports, the flow from chamber A to chamber B will be decreased and the pressure in chamber A will rise.

To describe accurately the ordinary operation of the mechanism, we must assume in connection with the following description, that the difference between meter inlet and valve outlet pressures rises to exceed the maximum pressure differential which the adjustment of the control valve will permit to be applied to the meter. In other words, the differential pressure between the meter inlet and the valve outlet must be assumed to exceed slightly the differential of meter inlet and meter outlet pressures which the control valve is adapted to maintain.

Under these conditions, if the meter inlet pressure should increase, the pressure on the upper side of piston 57 would also increase with the result that the valves 59 and 63 would be moved toward port closing position. The consequent throttling of the ports would present greater resistance to the flow of fluid from chamber A to chamber B and, as a result of such resistance, the pressure in chamber A would also rise to a magnitude which would again reestablish the initial differential between meter inlet and meter outlet pressures. By reason of the clearance provided between the valves and ports, there will be no sudden and violet fluttering of the valve, but rather a gradual motion of the valve back and forth until equilibrium has again been established.

Similarly, should the inlet pressure drop, the pressure in chamber A, operating against the lower surface of piston 59, together with the effort of spring 42, will force the piston up, moving the valves away from their port closing position. As a result of this motion, the resistance to fluid flow from chamber A to chamber B is reduced and the pressure in chamber A is correspondingly lowered to again establish the initial differential between meter inlet and meter outlet pressures.

Thus it will be seen that a change of pressure in the meter inlet chamber in either direction or of any reasonable magnitude will produce a corresponding change of pressure in the meter outlet chamber and the differential of the pressures in these chambers will remain constant.

Under the condition assumed above, if we raise the valve outlet pressure, there will be a reduced rate of flow from chamber A to chamber B and a corresponding increase of pressure in chamber A. The piston 57 will be moved upward by this increased pressure and move the valves away from port closing position, thereby enlarging the valve opening and increasing the rate of flow. This, in turn, relieves chamber A of the excess pressure and restores the original meter inlet-meter outlet pressure differential.

Similarly, if the valve outlet pressure should drop, there would be a greater flow of fluid from chamber A to chamber B, resulting in a reduction of the pressure in chamber A. Consequently, the piston 57 would move downwardly to cause the valves to more nearly close the ports and as a result of this restriction of the ports and increased resistance to the flow of fluid between the chambers, the pressure in chamber A would rise to that required to maintain the meter inlet and meter outlet pressure differential unchanged.

Because the valves 59 and 63 are actuated solely by the difference in the meter inlet pressure and the meter outlet and spring pressures, it is obvious that if simultaneous changes occurred in meter inlet and valve outlet pressures, the resulting change in position of the valve would be the summation of the changes induced by the individual pressure changes.

As noted above, the motion of the valves is limited by the contact of valve stem 61 with boss 33 or abutments 55. This limiting of the motion of the valve obviously limits the range of control exerted by the valve. Thus, if the valve outlet pressure becomes so low or the meter inlet pressure becomes so high that the valves, even in their maximum port closing position, cannot sufficiently restrict the flow of fluid from the chamber A to chamber B to build up the meter outlet pressure to the magnitude necessary to maintain the differential pressure constant, it is obvious that the range of control of the valve has been exceeded.

Conversely, if the valve outlet pressure rises to the point that, even when the valves are in full port opening position, the resistance to flow of fluid from chamber A to chamber B is so great that the effect of the pressure in chamber A added to the effect of spring 42 entirely overcomes the effect of the inlet pressure on the valve, the range of operation of the valve has not yet been reached. Since the differential between meter inlet and meter outlet pressures would under such conditions, be less than that normally maintained by the valve, there is no danger of overspeeding or of inaccurate measurement by the meter.

A similar condition to that just described exists when the meter inlet pressure is so low that it is incapable of overcoming the combined effect of the pressure which obtains in chamber A with the ports 27 and 29 fully open and the spring pressure.

By adjusting the set screw 73 up or down in the head 72 of valve element 61, the spring seat 69 is positioned to regulate the amount of compression of the spring and consequently the force exerted by it upon the element 61 tending to move the valves 59 and 63 to full port opening position. When an inlet pressure is high enough to balance the effect of the pressure in chamber A and the spring pressure when all are applied to the piston 57, so that slight additional pressure on either side of the piston would move it one way or the other, the differential of meter inlet and meter outlet pressures existing at that time is the differential which will be maintained during operation of the system and that to which the meter will be subjected during operation within the range of operation of the valve, as explained in preceding paragraphs. It will be thus seen that changing the spring pressure will change the operating pressure differential.

In the modification of applicant's invention shown in Figure 2, an arrangement is provided for use in installations where it is unnecessary to provide a record of the measured fluid, but where it is necessary to maintain a given rate of flow of the fluid. In such case it is proposed to utilize a control valve 101, which is of the same construction as that disclosed in Figure 1, in connection with a simple fixed orifice 103 which is inserted in the dispensing line 105 preferably upstream of the valve 101. A conduit 107 connects the orifice inlet side to the upper side of the piston of the valve.

It is well known that so long as the difference of pressures on opposite sides of the orifice is maintained constant and the other conditions, such as viscosity and temperature, etc., of the fluid remain substantially constant, the flow through the orifice will remain constant.

Heretofore, it has been difficult if not impractical to attempt to utilize an orifice of the type disclosed in ordinary fluid dispensing work because of the difficulty in maintaining a constant differential of inlet and outlet pressures. Usually the pressure on the inlet side is variable, and to overcome this condition pressure regulators have been utilized in the inlet conduits to throttle a higher pressure to a constant lower pressure. These devices however, are complicated and costly, and do not operate at pressures below that which they are supposed to deliver, with the result that their range of operation is severely restricted. Obviously, also, they cannot be utilized to control a condition of pressure change which occurs in the outlet conduit or downstream side of the orifice. Applicant's device as used with a meter of any type, including the simple orifice, fulfills all the demands placed upon it, either by changes in pressures in the inlet and/or in the outlet conduit. Applicant eliminates the need for costly and relatively ineffective pressure regulators and accomplishes the desired result in a simple, direct and relatively inexpensive manner. The action of the valve in combination with the orifice is exactly the same as was fully described in connection with the displacement meter hence it is deemed unnecessary to repeat the description of operation.

It is obvious that the adjustment of the spring 42 to secure a given rate of flow through the orifice would be necessary. This adjustment could be made by experiment or in accordance with calculations based upon the pressure differential necessary to obtain the desired flow of fluid.

In the embodiment of my invention which is shown in Figure 3, I use a variable orifice 123 which may be in the form of an ordinary valve of any suitable or desired type which is connected by means of a nipple 125 to a control valve 121. Said control valve is in all respects the same as that shown in detail in Figures 1 and 2, and has the upper side of the piston connected by means of tube 127 to the conduit 139 ahead or upstream of the valve 123. A handwheel 129 is connected to operate the valve stem 141 which in turn controls the size of the valve opening or orifice.

A pointer 131 is fastened by means of a pin 133, or any other suitable fastening, to move with the stem. Cooperating with said pointer is an indicating dial 135 which is fixedly supported on the valve. This dial may be graduated in terms of orifice size, rate of flow, etc., as the demand requires.

In operation of this modification it will be found that the resistance of the valve will vary with the size of the orifice used. However, by calibrating the scale 135, as for instance, in terms of gallons per minute, it will be found that at each position of the pointer with respect to the dial, a definite flow will result. Thus, whenever the pointer is brought to any given position, the rate of flow corresponding to the indicated rate of flow will obtain and will be maintained by operation of the control valve. The control valve will adjust itself to maintain a constant differential pressure across the orifice regardless of the variations in the fluid pressure in the intake and/or discharge conduits, so long as the range of operation of the valve is not exceeded. This operation of the control valve was fully described in connection with Figure 1 and since its operation in this case is exactly the same as when it is used with a displacement meter, it is not deemed necessary to repeat the description of its operation.

Changes may be made in the form, construction and arrangement of parts without departing from the spirit of the invention or sacrificing any of its advantages, and the right is hereby reserved to make all such changes as fairly fall within the scope of the following claims.

Having thus described my invention, what I claim as new and desire to secure by Letters Patent of the United States is:

1. In a liquid dispensing system, the combination of a liquid measuring device, means for supplying liquid under pressure thereto, a valve and port associated with said device for regulating the discharge of liquid therefrom, said valve having an area of from ninety to ninety-five percent of the area of said port, and automatic means for operating said valve to maintain the discharge pressure of said liquid a predetermined amount below the supply pressure.

2. In a control valve for controlling liquid flow, a valve body having a flow channel, a ported web located thereacross to form inlet and outlet chambers, a pressure balanced valve movable to variably restrict said port, said valve at maximum closure serving to obstruct substantially from ninety to ninety-five per cent of the port area, a pressure responsive element connected to said valve, means for applying the inlet chamber pressure to one side of said element and for applying a different pressure to the other side thereof, and adjustable spring means acting upon said element to establish the difference between the first mentioned pressures necessary to cause operation of the valve.

3. In a liquid system, the combination of a hydraulic instrument having an inlet and an outlet and having a resistance to the flow of fluid therethrough which causes the pressures in said inlet and outlet to differ, a valve body provided with a valve port and connected to said instrument so that the same fluid will pass through both said instrument and said valve port, a valve in the valve body associated with said valve port and movable to variably restrict the port so as to restrict the flow of fluid therethrough, pressure responsive means, means differentially connecting said pressure responsive means with said inlet and outlet and connected to operate said valve as said pressure differential varies from a predetermined value so as to reestablish said predetermined value, said valve and valve port being relatively proportioned so that when said valve is moved to a maximum valve port restricting position by said pressure responsive means, said valve port will be open sufficiently to prevent the creation of water hammer in the system by operation of said valve.

4. In a liquid system, the combination of a hydraulic device, means for supplying liquid under pressure to said device, valve means including a valve for controlling the pressure at the discharge side of said device by controlling the quantity of liquid discharged therefrom, pressure responsive means attached to operate said valve, means for applying supply pressure to said pressure responsive means in a direction tending to close said valve, means for applying discharge pressure to said pressure responsive means in a direction tending to open said valve, adjustable spring means, means for applying the force of said spring means to said valve in aid of said discharge pressure, said spring means serving to determine the maximum differential of supply and discharge pressures which will be applied to said device, said valve means being constructed to permit passage of fluid at all times in quantities sufficient to prevent the creation of water hammer by preventing extreme variations in said discharge pressure as said valve is adjusted by said pressure responsive means.

5. In a liquid dispensing system, the combination of a liquid measuring device, means for supplying fluid under pressure thereto, valve and port means associated with said device for regulating the flow of liquid therethrough, said valve means having an area of from ninety to ninety-five per cent of said port means, and automatic means for operating said valve means to maintain a predetermined difference between the pressure at which liquid is supplied to said device and that at which it is discharged therefrom.

6. In a liquid dispensing apparatus comprising a flow line, the combination of an hydraulic instrument having a conduit forming a portion of said flow line, said instrument serving to create a pressure differential in said flow line, a valve body having a liquid channel therein, connected in series with the conduit in said instrument, said valve body having a U-shaped partition disposed across said channel, axially aligned ports in said partition, balanced valve means mounted for movement to port restricting or port open positions, yieldable means tending to hold said valve means in port open position, pressure responsive means connected to operate said valve means, means for applying the differential pressure created by said instrument to said pressure responsive means in opposition to said yieldable means, said valve means having an area sufficiently less than the area of said ports to prevent the creation of water hammer in said apparatus when said valve means are suddenly actuated by said pressure responsive means.

HOSMER LOUIE BLUM.